May 18, 1948.  P. M. MUELLER  2,441,644
COLLET CHUCK CLOSER
Filed Nov. 13, 1946
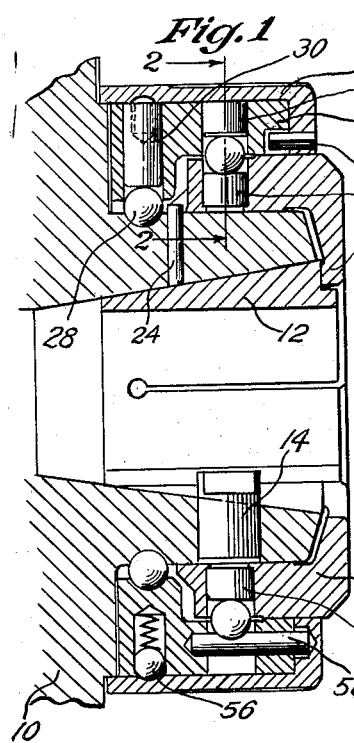
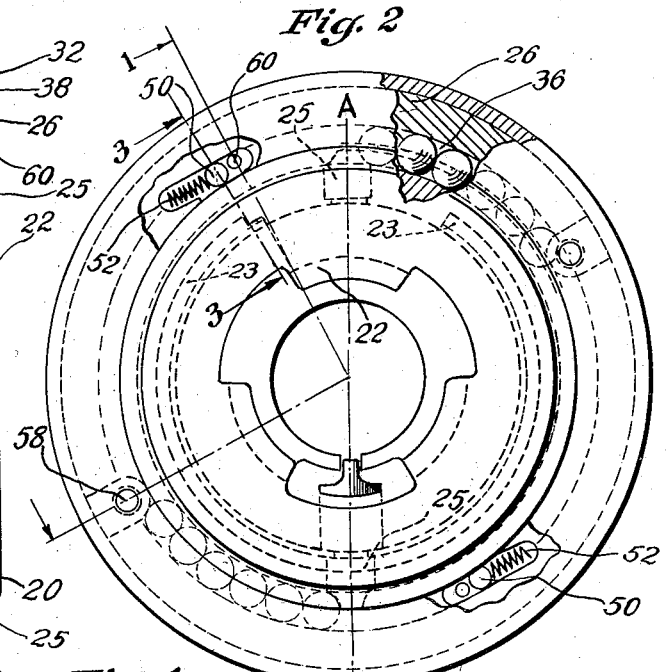
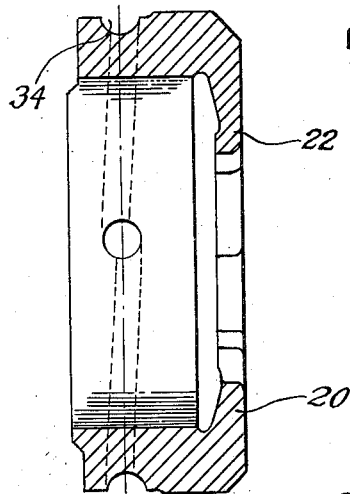
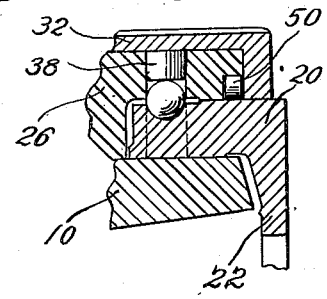
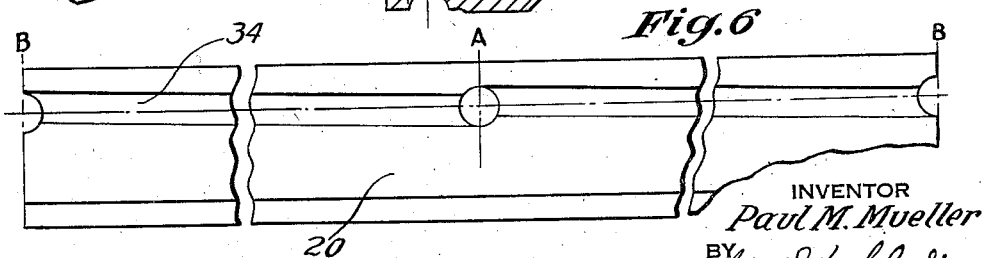
INVENTOR
*Paul M. Mueller*
BY *Joseph M. Schofield*
ATTORNEY Patented May 18, 1948

2,441,644

UNITED STATES PATENT OFFICE 2,441,644

COLLET CHUCK CLOSER

Paul M. Mueller, West Hartford, Conn., assignor to Niles-Bement-Pond Company, West Hartford, Conn., a corporation of New Jersey Application November 13, 1946, Serial No. 709,624

6 Claims. (Cl. 279—51)

This invention relates to an improved collet chuck closing means adapted for mounting on the end of a machine tool spindle to support work pieces or tools in position for operation.

A primary object of the invention is to provide a simple, rugged collet closing device operable from the collet end of the spindle on which the chuck is mounted and providing closing means which will effect a firm grip on a tool or work piece inserted within the collet and spindle with a relatively light pressure applied to the operating member.

A feature of importance is that the collet closing member mounted on the body member is provided with a bearing having balls operating within helically disposed grooves in the closing member and the operating member therefor, there being preferably two successive helical grooves each extending circumferentially approximately one-half way about the periphery of the member in which it is formed, the grooves being continuous, one with the other, and offset at their junctions by an amount dependent upon the lead of the grooves.

Another feature that is important is that the operating member for opening and closing the chuck is mounted upon the chuck body on ball bearings operating within annular grooves within the chuck body and operating member so that this operating member may be easily rotated with minimum friction.

And finally it is an object of importance that improved opening means are provided to effect releasing and opening of the collet to disengage the collet from a work piece or tool.

With the above and other objects in view, my invention consists in the features of construction and operation set forth in the following specification and illustrated in the accompanying drawing.

In the accompanying drawing annexed hereto and forming a part of this specification, the invention is shown embodied in a collet chuck attachable to the spindle of an engine lathe, but it will be understood that the invention can be otherwise embodied and that the drawings are not to be construed as defining or limiting the scope of the invention, the claims appended to this specification being relied upon for that purpose.

In the drawing:

Figure 1 is a side elevation, in broken section on planes of the line 1—1 in Fig. 2, showing a complete collet chuck made according to the present invention.

Fig. 2 is a front elevation of the chuck shown in Fig. 1, parts being broken away to show the clutch, and on the plane of line 2—2 in Fig. 1 to show the helical ball races.

Fig. 3 is a cross-sectional view taken on the plane of line 3—3 in Fig. 2.

Figs. 4 and 5 are, respectively, cross-sectional and a partial front elevation of the collet closing member, and Fig. 6 is a developed view of the helical grooves in the collet closing member.

In the above-mentioned drawing I have shown but one embodiment of the invention which is now deemed preferable, but it is to be understood that changes and modifications may be made within the scope of the appended claims without departing from the spirit of the invention.

Briefly, and in its broadest aspect, the invention may include a chuck body member, a spring collet member centrally positioned therein and movable axially to grip or release the part being held within the collet. The invention includes also a collet closing member fitting over the chuck body and having inwardly extending projections contacting the front face of the collet. Finally the collet closing member is moved axially without rotation by a ball bearing supported operating member.

Referring more in detail to the figures of the drawing, the chuck body 10 is shown at one end of a machine tool spindle or other rotating member and extends axially and centrally from the spindle. Extending centrally within the chuck body 10 or end of the spindle is a conical recess within which may be inserted any one of a series of collets 12 of usual or standard form having cylindrical axially extending openings of different diameters thereon to accommodate work pieces or tool shanks of different size. The outside surface of the collet 12 is conical and closely fits the recess in the chuck body 10. In order to prevent rotation of the collet 12 within the chuck body 10 a radially extending plug 14 may be mounted within the chuck body and engage a longitudinal slot in the collet 12. The collets 12 used with the present form of closing device are or may be of the usual or conventional type, longitudinal slots being cut therein from opposite ends to permit limited radial expansion and contraction.

The locking of this collet 12 within the chuck body 10 is effected by an annular closing member 20 having radial inwardly extending projections 22 bearing against the front end surface of the collet 12. This closure member 20 fits closely over the outer cylindrical surface of the chuck body 10 and is permitted limited angular movement thereon by one or more pins 24 extending through the body member and entering an annular slot in the chuck closing member 20 extending over a wide arc to permit sufficient angular movement of the member to move projections 22 from open to locking position.

Surrounding the chuck closing member 20 is an operating member 26 mounted upon an annular ball bearing 28, there being an annular circumferential groove in the chuck body and a similar one within the internal cylindrical surface of the operating member to form a continuous circumferential ball race. To fill these circumferential grooves with balls forming this bearing, a radially extending loading slot is provided in the operating member which may be closed by an appropriate pin 30 completely filling the hole and held in place by a sleeve 32 pressed in position over the outer periphery of the operating member 26. For convenience in grasping and operating this member 32 its outer surface may be appropriately knurled.

The outer periphery of the locking member 20 and the forward internal portion of the operating member 26 in contact therewith are each provided with helical grooves 34 and 36, respectively, there being two or more similar helical grooves each extending partially about the periphery of the closing member and the internal surface of the operating member. One of these surfaces is shown in developed form in Fig. 6, the grooves being disposed so that they form a continuous but jointed groove extending completely about these members. Disposed between these members and lying in these helical grooves are a series of balls, as shown in Figs. 1 and 2. To load the balls in these grooves a radial slot is provided, which, after the balls are inserted, may be closed by an appropriate pin 38.

It will be seen from an inspection of these helical grooves 34 and 36 that rotation of the operating member 26 upon its annular ball bearing 28 will, by virtue of these helical grooves, force the closing member 20 axially to engage or disengage the front end surface of the collet 12 and force the collet axially. The pitch of these helical grooves is relatively slight so that a substantial angular movement of the operating member 26 is required to axially advance the closing member 20 an amount necessary to effect firm closing or gripping action of the collet upon a work piece or other part within the collet.

The foregoing description discloses a collet mechanism which is satisfactory for use in connection with spindles which, during service, are accelerated or braked at moderate speeds but not operated at extremely high speeds. For very high speed spindles, the momentum of the operating member 26, on account of its necessary weight and inertia, may cause unlocking of the mechanism as described above. Hence, for speeds above approximately 2000 R. P. M., it is necessary to further modify the construction to include a device which will prevent rotation of the member 26 relative to the member 20 when the brake is applied at high speeds. This is shown most clearly in Figs. 2 and 3.

A roller type one-way clutch, whose roller is 50 and actuating spring 52, is placed in a wedge shaped pocket formed at the periphery of the member 20 in the member 26 and a tangential slot milled in the face of piece 26, thus providing an acute jamming angle as is customary with this type of overrunning mechanism.

It will be apparent that member 26 may be rotated easily in the closing direction but that the roller 50 jams to prevent contrary rotation. To break the jam of this clutch when unlocking rotation is desired, the operating member 26 has loosely fitted over its outer periphery a sleeve 32, the outer surface of which may be knurled for convenient operation. The spring detent in the form of a ball 56 is provided within the operating member 26 engaging a small annular recess in the sleeve 32 to retain the sleeve in proper position axially and at the same time permitting rotation of the sleeve relative to operating member 26. To cause a positive rotation of the operating member 26 when the sleeve 32 is manually operated, a pin 58 is inserted and held in fixed position in the member 26. This pin 58 engages a cylindrical recess in the sleeve member 32 of somewhat larger diameter than the pin permitting slight relative rotation of the sleeve 32 and the member 26 to the extent of the difference in diameter of the pin and the recess.

Thus, when the sleeve 32 is rotated in the closing direction the pin 58 drives member 26 with it in the normal manner. When the sleeve 32 is rotated to unlock and open the chuck, the pin drives in the same fashion in the other direction but before it reaches the extent of its clearance, pin 60 adjacent the roller 50 makes contact with the clutch roller 50 and breaks its jam in the acute angle formed by the milled recess and the periphery of piece 20. The clutch thus becomes inoperative and the closing member 20 can be opened in the normal manner.

It will be noted that the momentum of piece 26 tends to unlock when the spindle is braked too rapidly. The weight of the sleeve 26, however, can be kept sufficiently low so that its momentum is restrained, both by the friction of the detent balls 50 and the pressure of the spring 52, which must be overcome before the jam of the roller clutch is broken.

The roller clutch provides an additional advantage beyond locking against momentum. In the initial description for the closure shown but with the overrunning clutch omitted, it may be noted that the closing member 20 must be rotated by hand to carry the projections thereon into locking position relative to the castellated faces on the collet 12, after which manual rotation of the operating member 26 completes the closing.

It will also be noted that one continuous releasing motion of member 26 will not only open the collet but also unlock it. It is desirable to eliminate the extra motion of locking at the beginning of the operation.

It also will be apparent that the friction of the roller clutch 50 will provide this action and that at the beginning of the operation members 26 and 20 will rotate together until the pin or pins 24 strike the end of the annular slot or slots 23. Continued rotation of member 32 in the closing direction is not impeded by the clutch except to the extent of the small friction introduced by the spring pressure against the roll. Hence, the roller clutch performs two functions: at the beginning of the operation it eliminates an extra manual rotation of member 20, and second, once the closing is complete it prevents member 26 from backing off and opening the chuck until this is permitted by the rotation of sleeve 32 in the opening direction.

The balls within helical grooves 34 and 36 are disposed between abutments respectively in the closing member 20 and operating member 26. Within closing member 20 are provided radially extending plug members 25 having their outer ends extending into the grooves 34. In the operating member 26 are pins 58 extending parallel with the axis, their outer ends entering enlarged recesses in the sleeve member 32. These pins 58 have previously been referred to for the purpose of causing rotation of member 26 when the sleeve member 32 is rotated. In moving from locked to open position, the balls within grooves 34 and 36 move between these abutments 25 and 58, the movement being sufficient to move the projections 22 on the closing member 20 from one extreme position to the other.

I claim:

1. A collet construction comprising a body member at one end of a machine tool spindle, a collet therein having a conical bearing with said body member, a closure member axially movable on said body member and having portions engaging the outer face of said collet, and an operating member for said closure member rotatable on said body member, said operating member having a helical engagement with said closure member, whereby rotation of said operating member relative to said body member will force said closure member axially to open or close the collet.

2. A collet construction comprising a body member at the end of a machine tool spindle, a collet therein having a conical bearing with said body member, a closure member axially movable on said body member and having portions engaging against the outer face of said collet, a plurality of helically disposed grooves in said closure member, and an operating member for said closure member rotatably supported on said body member, said operating member having helical grooves corresponding to the grooves in said closure member, and anti-friction members within said grooves, whereby rotation of said operating member relative to the body member will force said closure member axially to open or close the collet.

3. A collet construction comprising a body member at the end of a rotatably mounted spindle, a collet therein having a conical bearing with said body member, a closure member slidably mounted on said body member and having portions engaging the outer face of said collet, and an operating member for said closure member rotatable upon an annular anti-friction bearing formed in said body member and operating member, said operating member having a helical engagement with said closure member, whereby rotation of said operating member will force said closure member axially to open or close the collet.

4. A closing means for chucks comprising a body member having a conical opening therein, a closure member supported for axial movement on said body member, an operating member supported on said body member for rotation thereon and held against axial movement, an anti-friction annular bearing for said operating member on said body member, and a helical anti-friction bearing for said operating member on said closure member, whereby rotation of said operating member relative to said body member will force said closure member axially.

5. A closing means for chucks comprising a body member having a conical opening therein, a closure member supported for axial movement on said body member, an operating member supported on said body member for rotation thereon and held against axial movement, anti-friction bearings for said operating member on said body member, helical anti-friction bearings between said operating and closing members, and a one-way clutch retaining said operating member in locking position on said closing member when moved to locking position.

6. A closing means for chucks comprising a body member having a conical opening therein, a closure member supported for axial movement on said body member, an operating member supported on said body member for rotation thereon and held against axial movement, anti-friction bearings for said operating member on said body member, helical anti-friction bearings between said operating and closing members, a one-way clutch retaining said operating member in locking position on said closing member when moved to locking position, and a sleeve surrounding said operating member for moving said operating member to locking and unlocking positions.

PAUL M. MUELLER.